Figure 1:
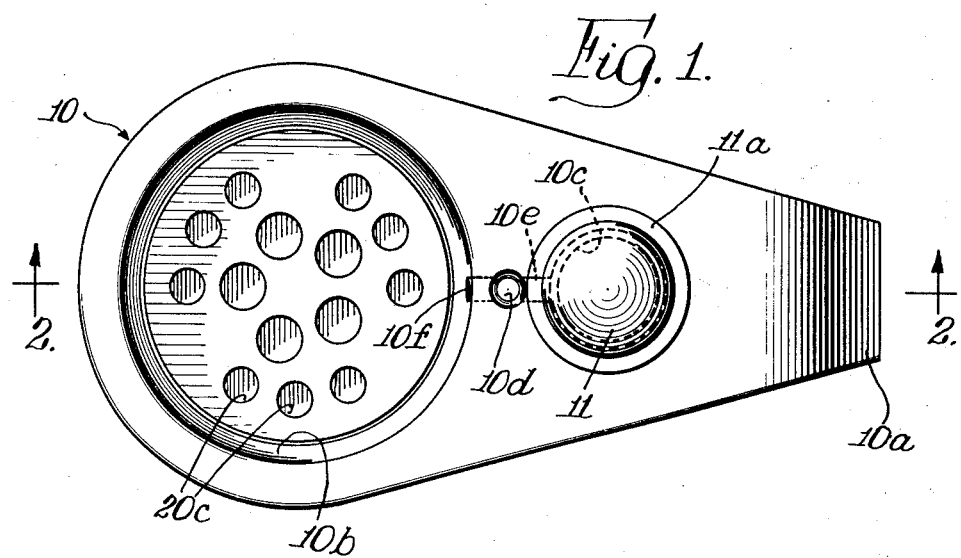

May 27, 1958 — D. CHAPMAN — 2,836,700

BOTTLE WARMER

Filed Nov. 2, 1955

INVENTOR:
David Chapman
BY
Smith, Olson, Baird & Miller,
Atty's.

United States Patent Office 2,836,700
Patented May 27, 1958

2,836,700

BOTTLE WARMER

David Chapman, Chicago, Ill., assignor to Hankscraft Company, Reedsburg, Wis., a corporation of Wisconsin Application November 2, 1955, Serial No. 544,404

5 Claims. (Cl. 219—43)

This invention relates to improvements in bottle warmers such as those disclosed in United States Letters Patent No. 2,582,781, granted January 15, 1952, on an application of Arne B. Johnson, and No. 2,246,677, granted June 24, 1941, on an application of Marshall W. Hanks, wherein a baby's bottle is heated by steam produced by the vaporization of a measured quantity of water contained in a vessel having located therein spaced electrodes between which an electric current passes, thereby heating the water. When the measured quantity of water has evaporated, the operation of the device is automatically terminated and it thus has a definite time period of operation adapted to heat the milk in the bottle to the desired temperature without attention on the part of the operator.

The principal object of the present invention is to provide an improved bottle warmer of the type referred to comprising means for storing a quantity of water and for discharging it by measured increments into the heating chamber. Another object of the invention is to provide a liquid conductor heater comprising a heating chamber and a water storage chamber in combination with a device for discharging quantities of water by pneumatic pressure from the storage chamber and directing them into the heating chamber, whereby a predetermined quantity of water may be introduced into said heating chamber by a selected number of operations of said device. Other objects relate to various features of construction and arrangement which will appear more fully hereinafter.

Figure 2:
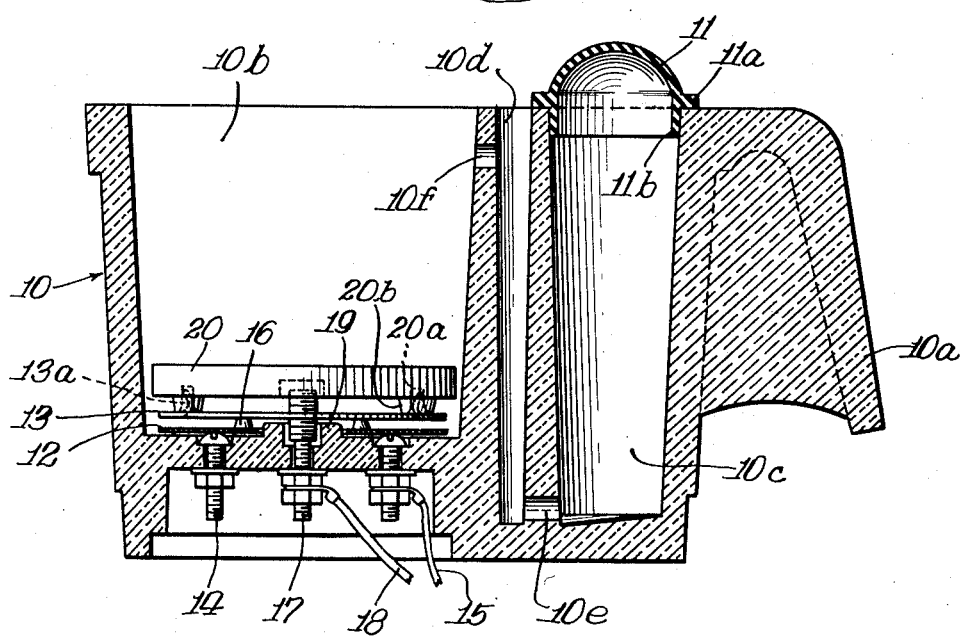

The nature of the invention will be understood from the following specification taken with the accompanying drawings in which one embodiment is illustrated. In the drawings:

Figure 1 shows a top plan view of a bottle warmer embodying the present invention; and Fig. 2 shows a vertical section taken on the line 2—2 of Fig. 1.

As illustrated in the drawings, the invention comprises a vessel 10 formed of porcelain or other suitable insulating material which is extended laterally at one side and provided with a projecting handle 10a. In the larger portion of the porcelain body there is provided a heating chamber 10b, in which the bottle is adapted to be placed, and in the lateral extension thereof there is provided a water storage chamber 10c. Between these two chambers there is an upright channel or passage 10d which communicates at its lower end with the chamber 10c through a port 10e. The channel 10d is open to the atmosphere at its upper end and it communicates adjacent that end with the heating chamber 10b through a port 10f.

In the top of the chamber 10c there is fitted a dome-shaped cap member 11, formed of rubber or the like, which has an annular flange 11a adapted to rest on the top surface of the vessel and another depending flange 11b arranged to fit closely the upper end of the chamber. Assuming that the chamber 10c has been partially or wholly filled with water, the operator may press on the cap 11 with the result that the air in the chamber 10c above the water is compressed and a quantity of water is then propelled from the chamber 10c and upwardly in the channel 10d until it is discharged through the port 10f into the heating chamber 10b.

The water thus discharged into the heating chamber is heated by heating means located at the bottom of the chamber. This heating means may take various forms but has been shown as being constructed in the manner disclosed in said Letters Patent No. 2,582,781. This heating means comprises two spaced electrodes 12 and 13, the former of which is connected in an electric circuit by terminal posts 14 mounted on the lower wall of the vessel and connected to the supply conductors 15. The upper electrode 13 is in the form of a flat circular metal plate spaced from the lower electrode by insulating lugs 16 which are formed on the lower wall of the vessel and which project upwardly through apertures in the lower electrode 12. The upper electrode is further apertured at its center to form a threaded engagement with a terminal post 17 which is sealed in an aperture in the lower wall of the vessel and connected to a supply conductor 18. The lower wall of the vessel has a central projection 19 which extends upwardly into the central opening of the ring-like plate 12.

The upper electrode is provided with a plurality of apertures distributed throughout its area to permit the escape of bubbles formed by the vaporization of the water between the electrodes and it is further provided with upstanding tongues 13a which interlock with the walls of recesses 20a formed in the underside of an insulating plate 20 which is spaced upwardly from the upper electrode 13 by the projections 20b formed around the recesses. This plate 20 is provided with a plurality of circular apertures 20c which permit the escape upwardly of bubbles rising from the electrodes. The baby's bottle to be heated is placed in the chamber 10b with its bottom resting on the insulating plate 20. With the conductors connected to the source of supply the water on the chamber 10b will be heated and will continue to vaporize to heat the bottle and its contents until the water in that chamber is entirely evaporated. If it be then found that the contents of the bottle have not been sufficiently heated, an additional quantity of water may be injected into the heating chamber by actuating the bulb or cap member 11.

Although one form of the invention has been shown and described by way of illustration, it will be understood that it may be constructed in various other embodiments which come within the scope of the appended claims.

I claim:

1. A bottle warmer comprising a vessel having a heating chamber and a water storage chamber connected by an upright channel, the lower portion of said channel communicating with the lower part of said storage chamber and the upper portion of said channel communicating with the upper part of heating chamber, and pneumatic means mounted at the upper part of said storage chamber for discharging water from the lower part of said storage chamber through said channel into said heating chamber.

2. A bottle warmer comprising a vessel having a heating chamber and a water storage chamber connected by an upright channel, the upper portion of said channel communicating with the lower part of said storage chamber and the upper portion of said channel communicating with the upper part of heating chamber, and means including a bulb at the upper end of said storage chamber for discharging water by fluid pressure from the lower part of said storage chamber through said channel into said heating chamber.

3. A bottle warmer comprising a vessel having a heating chamber therein and a water storage chamber therein and an upright channel therein, the upper ends of said heating chamber and said channel being open to the atmosphere, a first port interconnecting said storage chamber and said channel adjacent the lower ends thereof, a second port interconnecting said heating chamber and said channel adjacent the upper ends thereof, and means in said storage chamber for discharging water by increments therefrom through said ports and said channel into said heating chamber.

4. A bottle warmer comprising a vessel having a heating chamber therein and a water storage chamber therein and an upright channel therein, the upper ends of said heating chamber and said channel being open to the atmosphere, a first port interconnecting said storage chamber and said channel adjacent the lower ends thereof, a second port interconnecting said heating chamber and said channel adjacent the upper ends thereof, means in said storage chamber for discharging water by increments therefrom through said ports and said channel into said heating chamber, and means comprising spaced electrodes for heating the water in said heating chamber.

5. A bottle warmer comprising a vessel having a heating chamber therein and a water storage chamber therein and an upright channel therein, the upper ends of said heating chamber and said channel being open to the atmosphere, a first port interconnecting said storage chamber and said channel adjacent the lower ends thereof, a second port interconnecting said heating chamber and said channel adjacent the upper ends thereof, and a collapsible bulb closing the upper end of said storage chamber, whereby collapse of said bulb forces water in increments out of said storage chamber through said ports and said channel into said heating chamber.

References Cited in the file of this patent

UNITED STATES PATENTS

| | | |
|---|---|---|
| 1,946,573 | Vries | Feb. 13, 1934 |
| 1,994,206 | Ziskin | Mar. 12, 1935 |
| 2,447,039 | Stabler | Aug. 17, 1948 |
| 2,582,781 | Johnson | Jan. 15, 1952 |
| 2,679,337 | Leach | May 25, 1954 |

FOREIGN PATENTS

| | | |
|---|---|---|
| 562,046 | Germany | Oct. 31, 1930 |
| 678,156 | France | Dec. 23, 1929 |
| 728,661 | Great Britain | Apr. 27, 1955 |